(12) United States Patent
Zeng et al.

(10) Patent No.: US 6,920,055 B1
(45) Date of Patent: Jul. 19, 2005

(54) CHARGE PUMPING SYSTEM AND METHOD

(75) Inventors: James S. Zeng, Cupertino, CA (US); Lajos Burgyan, Mountain View, CA (US); Rendon A. Holloway, Cupertino, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 0 days.

(21) Appl. No.: 10/678,678

(22) Filed: Oct. 3, 2003

Related U.S. Application Data (63) Continuation of application No. 10/196,790, filed on Jul. 16, 2002, now Pat. No. 6,657,875.

(51) Int. Cl.[7] .............................. H02M 3/18; G05F 1/10
(52) U.S. Cl. ......................................... 363/59; 327/536
(58) Field of Search ..................... 363/59, 60; 327/536, 327/537; 307/110

(56) References Cited

U.S. PATENT DOCUMENTS

| | | | | |
|---|---|---|---|---|
| 5,581,454 A | * | 12/1996 | Collins | 363/59 |
| 5,701,096 A | * | 12/1997 | Higashiho | 327/536 |
| 5,973,944 A | * | 10/1999 | Nork | 363/60 |
| 6,310,789 B1 | * | 10/2001 | Nebrigic et al. | 363/60 |
| 6,370,046 B1 | * | 4/2002 | Nebrigic et al. | 363/60 |
| 6,429,723 B1 | * | 8/2002 | Hastings | 327/536 |
| 6,538,930 B2 | * | 3/2003 | Ishii et al. | 365/189.09 |
| 6,570,435 B1 | * | 5/2003 | Hasting | 327/536 |
| 6,657,875 B1 | * | 12/2003 | Zeng et al. | 363/59 |

OTHER PUBLICATIONS

"Regulated 3.3V/5.0V Step–Up/Step–Down Charge Pump," 2001, *Maxim Integrated Products*, 8 pages.
"50mA Regulated Step–Down Charge Pump For 1.8V or 1.9V Logic," 2000, *Maxim Integrated Products*, 8 pages.

* cited by examiner

*Primary Examiner*—Adolf Berhane
(74) *Attorney, Agent, or Firm*—Sidley Austin Brown & Wood LLP (57) ABSTRACT

A charge pumping system capable of a forward operation mode and a reverse operation mode is provided. In forward operation mode the charge pumping system can step-up an input voltage at a ratio of ½:1 and can step-down the input voltage at a ratio of n:m where n and m are both integer values and n is equal to or greater than m. In reverse operation mode the charge pumping system can step-down the input voltage at a ratio of 1:½ and 1:1 and can step-up the input voltage at a ratio of p:q where p and q are both integer values and p is less than q.

16 Claims, 11 Drawing Sheets

ΔV = Voltage drop across the current sense resistor

CHARGE PUMPING SYSTEM AND METHOD

The present application is a continuation application of U.S. patent application Ser. No. 10/196,790, filed on Jul. 16, 2002, now U.S. Pat. No. 6,657,875, entitled "Highly Efficient Step-Down/Step-Up And Step-Up/Step-Down Charge Pump," which is assigned to the pre assignee and is incorporated in its entirety herein by reference.

FIELD OF THE INVENTION

The present invention relates generally to charge pump power supplies, and more particularly, to a charge pumping system and method.

BACKGROUND OF THE INVENTION

A voltage converter can be used to convert a lower voltage to a higher voltage (step-up operation) or to convert a higher voltage to a lower voltage (step-down operation). In some cases, a switched capacitor DC/DC converter employing a fractional conversion technique may be used. This technique reconfigures power switches based on input voltage (Vin) and output voltage (Vout) to achieve higher power efficiency than linear regulation does. Typical switch configurations for step-up operation include 1:1, 2:3, 1:2 and 1:3, and typical switch configurations for step-down operation include 1:1, 3:2, 2:1 and 3:1.

Some previously developed charge pumps are capable of providing only one direction of voltage conversion—either step-up or step-down. Other previously developed charge pumps are capable of both step-up and step-down operation. However, such other previous designs are efficient only one direction of voltage conversion. That is, a previously developed charge pump which can efficiently convert a lower voltage to a higher voltage cannot efficiently convert a higher voltage to a lower voltage. Likewise, a previously developed charge pump which can efficiently converts a higher voltage to a lower voltage cannot efficiently convert a lower voltage to a higher voltage.

SUMMARY OF THE INVENTION

Embodiments of the present invention include a charge pump capable of providing both step-down and step-up operation in an efficient manner.

In one aspect, a charge pump power supply circuit generates a regulated output voltage higher or lower than an input voltage. Such power supply circuit can be integrated on a single piece of semiconductor substrate material. In another aspect, other circuitry may be integrated on a single piece of semiconductor substrate material along with such a power supply circuit.

According to one embodiment of the present invention, a charge pumping system capable of a forward operation mode and a reverse operation mode is provided. In forward operation mode the charge pumping system can step-up an input voltage at a ratio of ½:1 and can step-down the input voltage at a ratio of at least one of 1:1, 3:2, 2:1 and 3:1. In reverse operation mode the charge pumping system can step-down the input voltage at a ratio of 1:½ and 1:1 and can step-up the input voltage at a ratio of at least one of 2:3, 1:2 and 1:3.

According to another embodiment of the present invention, a charge pumping system capable of a forward operation mode and a reverse operation mode is provided. The system includes a first node operable to be connected as an input node in the forward operation mode and as an output node in the reverse operation mode. A second node operable to be connected as an input node in the reverse operation mode and as an input node in the forward operation mode. In forward operation mode the charge pumping system can step-up an input voltage at a ratio of ½:1 and can step-down the input voltage at a ratio of at least one of 1:1, 3:2, 2:1 and 3:1. In reverse operation mode the charge pumping system can step-down the input voltage at a ratio of 1:½ and 1:1 and can step-up the input voltage at a ratio of at least one of 2:3, 1:2 and 1:3. A switching component, connected to the first node and the second node, is operable to be configured to set the ratio for step-up or step-down for the forward and reverse operation modes. The switching component may comprise at least one fractional switch having a plurality of segments.

Regulated step-up/step-down charge pump including 1:1, 2:3, 1:2 and 1:3 modes converts a lower input voltage to a higher output voltage using 2:3, 1:2 and 1:3 modes and converts a higher voltage to a lower voltage using 1:1 mode. Regulated step-down charge pump including 1:1, 3:2, 2:1 and 3:1 modes can only provide a lower output voltage from a higher input. Increasing from 4 modes to 5 modes by adding ½:1 to step-down charge pump and by adding 1:½ to step-up/step-down charge pump will have two advantages. One is increasing battery life and the other is improving power efficiency.

Other aspects and advantages of the present invention will become apparent from the following descriptions and accompanying drawings.

BRIEF DESCRIPTION OF THE DRAWING FIGURES

For a more complete understanding of the present invention and for further features and advantages, reference is now made to the following description taken in conjunction with the accompanying drawings, in which.

DETAILED DESCRIPTION OF THE PREFERRED EMBODIMENTS

The preferred embodiments of the present invention and their advantages are best understood by referring to FIGS. 1 through 7 of the drawings. Like numerals are used for like and corresponding parts of the various drawings.

Charge Pumping System

Figure 1A:
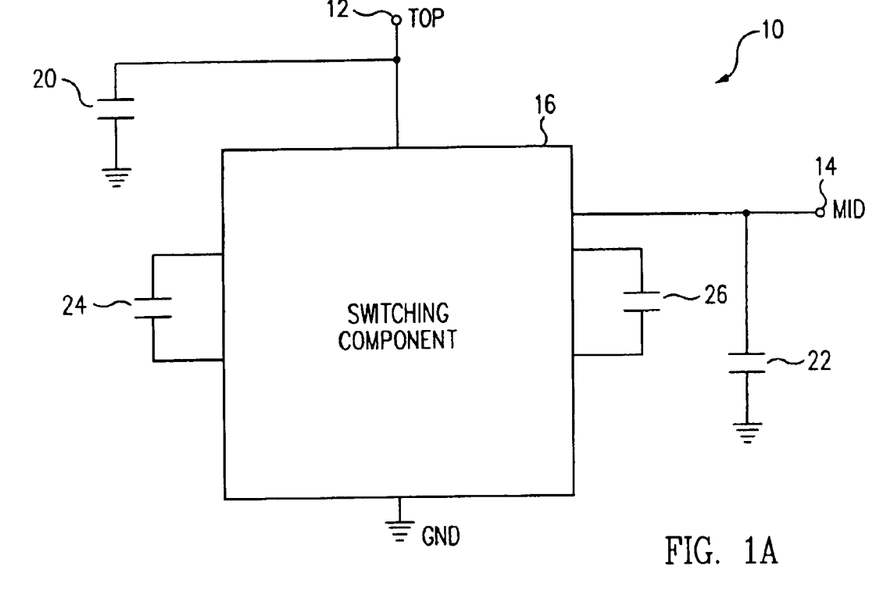
FIG. 1A is a schematic diagram of a charge pumping system, according to an embodiment of the present invention.

FIG. 1 is a block diagram of a charge pumping system 10, according to an embodiment of the present invention. System 10 can be implemented on a single chip—i.e., monolithic integrated circuit. System 10 may function to efficiently convert a lower voltage to a higher voltage and also efficiently convert a higher voltage to a lower voltage, as described in more detail herein.

As depicted, system 10 includes a first node 12 (labeled "TOP") and a second node 14 (labeled "MID"). The TOP node 12 and the MID node 14 may each function as either an input node or an output node, depending on how system 10 is connected for operation by a user. System 10 can be operated in "forward operation mode" or in "reverse operation mode". In the forward operation mode, the TOP node 12 is connected to receive an input for the system 10 and the MID node 14 is connected to yield the output. In the reverse operation mode, the MID node 14 is connected to receive an input for the system 10 and the TOP node 12 is connected to yield the output. In embodiments where system 10 is implemented on a chip, TOP node 12 and MID node 14 can each be connected to a respective external pin of the chip. As used herein, the terms "connected," "coupled," or any variant thereof, mean any connection or coupling, either direct or indirect, of two or more elements.

Figure 1B:
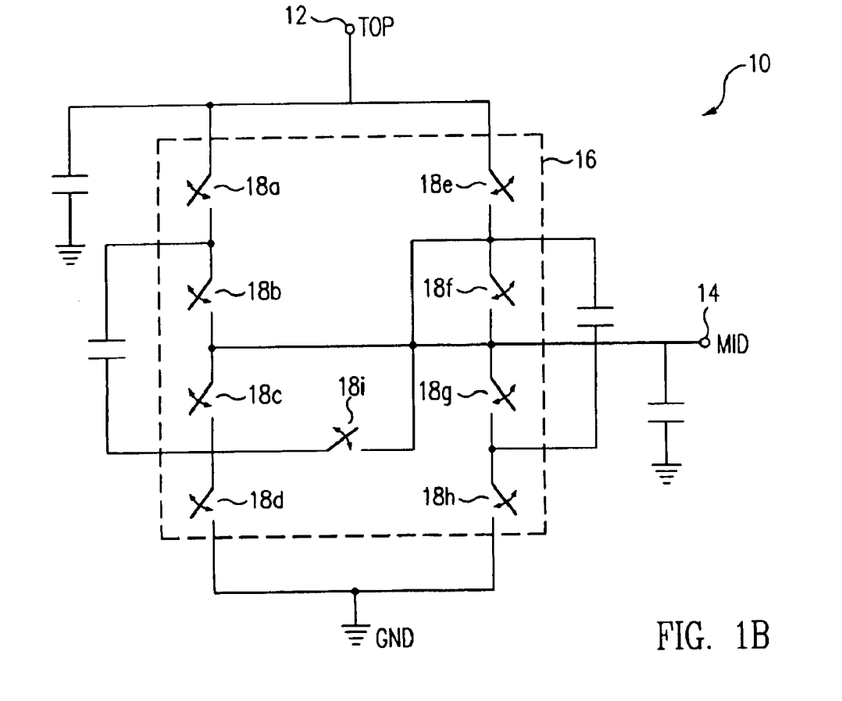
FIG. 1B is a schematic diagram of an exemplary implementation for the charge pumping system depicted in FIG 1A.

A switch component 16 is connected between TOP node 12 and MID node 14. Switching component 16 generally functions to adjust various connections in system 10 for various modes and respective phases for operation. As shown in FIG. 1B, in an exemplary implementation for system 10, switch component 16 comprises a number of switching elements 18 (separately labeled 18a, 18b, 18c, 18d, 18e, 18f, 18g, 18h, and 18i) which can be opened or closed during operation for system 10. In alternative embodiments, more or fewer switching elements 18 may be used for switch component 16. In some embodiments, each switching element 18 can be implemented with one or more suitable switching devices, such as, for example, a metal-oxide semiconductor field-effect transistor (MOSFET). Multiple switching devices for a switching element 18 implements a fractional switching technique, as described below in more detail.

A capacitor 20 is connected between the TOP node 12 and ground (GND), and a capacitor 22 is connected between the MD node 14 and GND. Capacitors 20 and 22 may function to reduce the input and output impedance (depending on the mode of operation) of system 10. A capacitor 24 and a capacitor 26 may be connected to the switching component 16. Capacitors 24 and 26 can function as "flying" capacitors through which energy is passed in two phases in order to step-up or step-down voltage from the input node to the output node. In the first phase (Phase I), voltage at the input node charges the flying capacitors 24 and 26. In the second phase (Phase II), the capacitors 24 and 26 transfer their charges to the output node as needed.

System 10 may operate in a forward operation mode and a reverse operation mode. In forward operation mode, the TOP node 12 is connected as the input and the MID node 14 is connected as the output, and system 10 may support the following conversion ratios: ½:1, 1:1, 3:2, 2:1 and 3:1. Since the ratio of ½:1 is step-up while the ratios of 1:1, 3:2, 2:1 and 3:1 are step-down, then in forward operation mode system 10 can be functioning as a regulated step-up/step-down charge pump. In reverse operation mode, the MID node 14 is connected as the input and the TOP node 12 is connected as the output, and system 10 may support the following conversion ratios: 1:½, 1:1, 2:3, 1:2 and 1:3. Since the ratio of 1:½ is step-down while the ratios of 2:3, 1:2 and 1:3 are step-up, then in reverse operation mode system 10 can be functioning as a regulated step-down/step-up charge pump.

With system 10, the present invention has the advantage of providing the forward and reverse operation modes (as described herein) in a single chip. Furthermore, the addition of supporting a ½:1 ratio in the forward operation mode (which is primarily step-down) and the addition of supporting a 1:½ ratio in the reverse operation mode (which is primarily step-up) increases battery life and improves power efficiency for system 10.

More specifically, adding a ratio of ½:1 to a step-down charge pump with ratios of 1:1, 3:2, 2:1 and 3:1 will result in a regulated step-up/step-down charge pump. Table 1 illustrates efficiency of one embodiment for system 10 for various battery voltages ranging from 0 to 6V, where the value of output voltage (Vout) is 2V, and where system 10 is operated as a regulated step-up/step-down charge pump. Comparing the ratio of 1:½ of system 10 to a conventional ratio of 1:1, it can be seen that there is an improvement in efficiency of about 40%.

TABLE 1

Step-Up/Step-Down Operation, Vout = 2 V

| Battery Voltage, V | Efficiency, % | Formula | Configuration | |
|---|---|---|---|---|
| 0.67 | 100 | Vout/3 Vin | 1:3 | Step-Up |
| 1.00 | 66.7 | Vout/3 Vin | 1:3 | Step-Up |
| 1.00 | 100 | Vout/2 Vin | 1:2 | Step-Up |
| 1.33 | 75 | Vout/2 Vin | 1:2 | Step-Up |
| 1.33 | 100 | Vout/1.5 Vin | 2:3 | Step-Up |
| 2.00 | 66.7 | Vout/1.5 Vin | 2:3 | Step-Up |
| 2.00 | 100 | Vout/Vin | 1:1 | Step-Down |
| 4.00 | 50 | Vout/Vin | 1:1 | Step-Down |
| 4.00 | 100 | Vout/0.5 Vin | 1:½ | Step-Down |
| 6.00 | 50 | Vout/0.5 Vin | 1:½ | Step-Down |
| 6.00 | 33 | Vout/Vin | 1:1 | Step-Down |

Adding a ratio of 1:½ to a step-down charge pump with ratios of 1:1, 2:3, 1:2 and 1:3 will result in a regulated step-down/step-up charge pump. Table 2 illustrates efficiency of one embodiment for system 10 for various battery voltages ranging from 0 to 6V, where the value of output voltage (Vout) is 2V, and where system 10 is operated as a regulated step-down/step-up charge pump. Table 2 shows the advantage of battery life expansion down 0.5V.

TABLE 2

Step-Down/Step-Up Operation, Vout = 1 V

| Battery Voltage, V | Efficiency, % | Formula | Configuration | |
|---|---|---|---|---|
| 0.5 | 100 | 0.5 Vout/Vin | ½:1 | Step-Up |
| 1 | 50 | 0.5 Vout/Vin | ½:1 | Step-Up |
| 1 | 100 | Vout/Vin | 1:1 | Step-Down |
| 1.5 | 66.7 | Vout/Vin | 1:1 | Step-Down |
| 1.5 | 100 | 1.5 Vout/Vin | 3:2 | Step-Down |
| 2 | 75 | 1.5 Vout/Vin | 3:2 | Step-Down |
| 2 | 100 | 2 Vout/Vin | 2:1 | Step-Down |
| 3 | 66.7 | 2 Vout/Vin | 2:1 | Step-Down |
| 3 | 100 | 3 Vout/Vin | 3:1 | Step-Down |
| 6 | 50 | 3 Vout/Vin | 3:1 | Step-Down |

The switching configurations for Phase I and Phase II for various conversion ratios in forward operation mode and reverse operation mode are illustrated in FIGS. 2A–2E In forward operation mode, the TOP node 12 is connected as the input node and the MID node 14 is connected as the output node. System 10 acts as a step-down/step-up charge pump. That is, system 10 generally functions to output a higher voltage at the output node (MID node 14) than the voltage applied at the input node (TOP node 12). In reverse operation mode, the MID node 14 is connected as the input node and the TOP node 12 is connected as the output node. System 10 acts as step-up/step-down charge pump. That is, system 10 generally functions to output a lower voltage at the output node (TOP node 12) than the voltage applied at the input node (MID node 14).

Figure 2A:
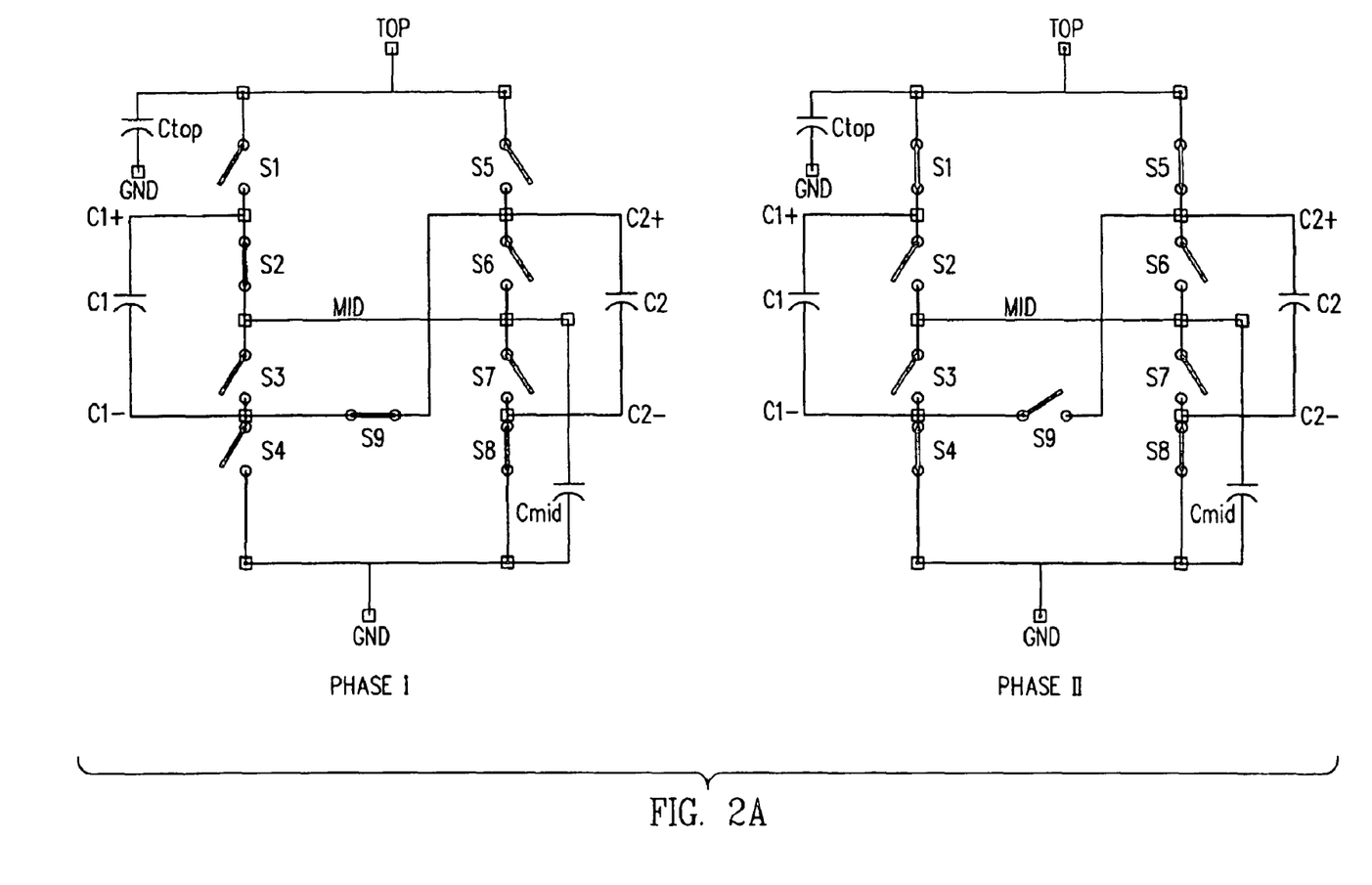
FIGS. 2A–2E are schematic diagrams illustrating switch settings of the exemplary implementation for a number of modes for the charge pumping system.

Referring to FIG. 2A, for conversion ratio of ½:1 in forward operation mode and conversion ratio 1:½ in reverse operation mode, switching elements 18a, 18c, 18d, 18e, 18f, 18g are open (or mostly "turned off" if transistors are used) and switching elements 18b, 18h, and 18i are closed (or mostly "turned on" if transistors are used) during Phase I. During Phase II, switching elements 18b, 18c, 18f, 18g, and 18i are open (or mostly "turned off") and switching elements 18a, 18d, 18e, and 18h are closed (or mostly "turned off").

Figure 2B:
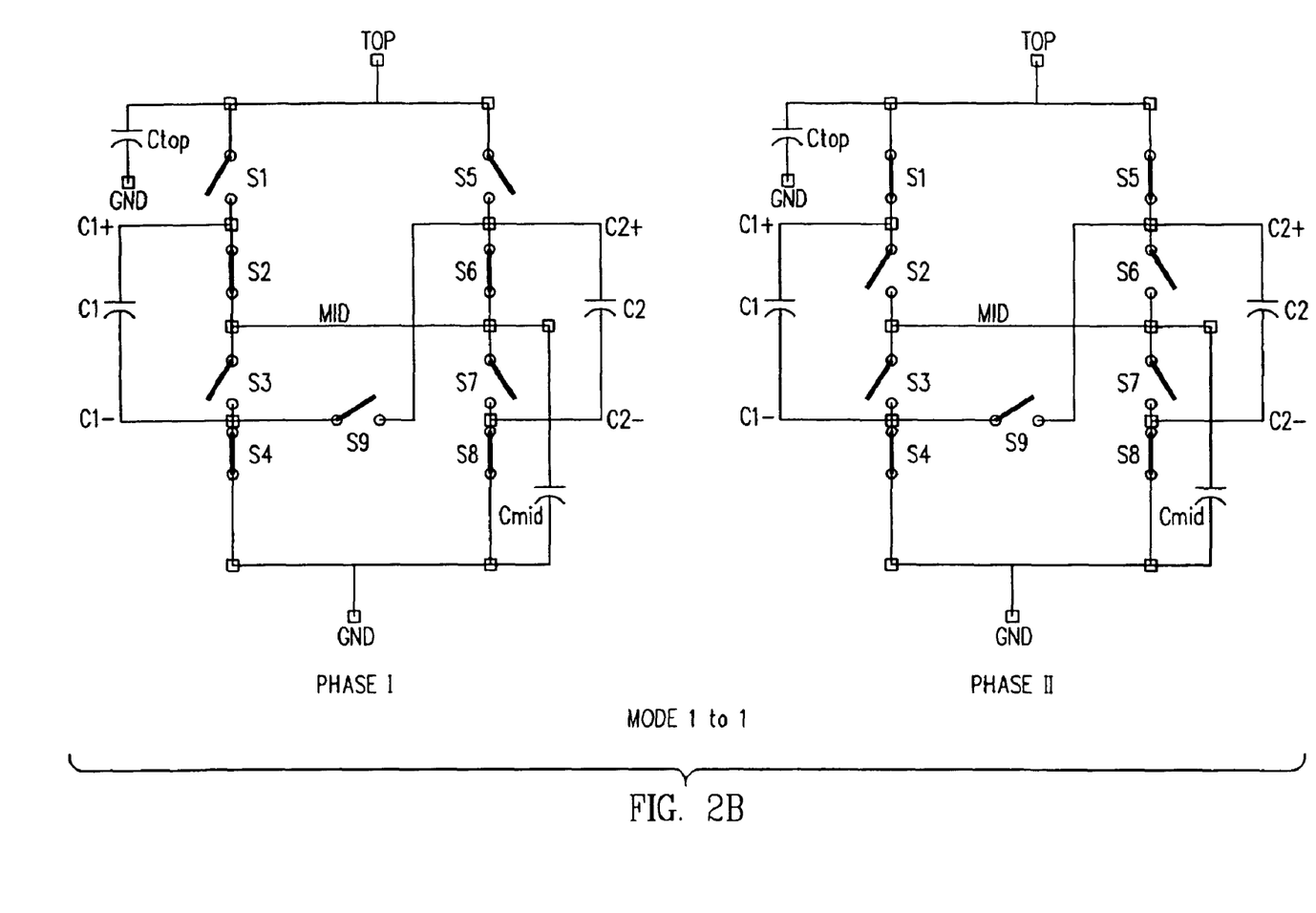

Referring to FIG. 2B, for conversion ratio of 1:1 in forward and reverse operation nodes, switching elements 18a, 18c, 18e, 18g, and 18i are open (or mostly "turned off") and switching elements 18b, 18d, 18f, and 18g are closed (or mostly "turned on") during Phase I. During Phase II, switching elements 18b, 18c, 18f, 18g, and 18i are open (or mostly "turned off") and switching elements 18a, 18d, 18e, and 18h are closed (or mostly "turned on").

Figure 2C:
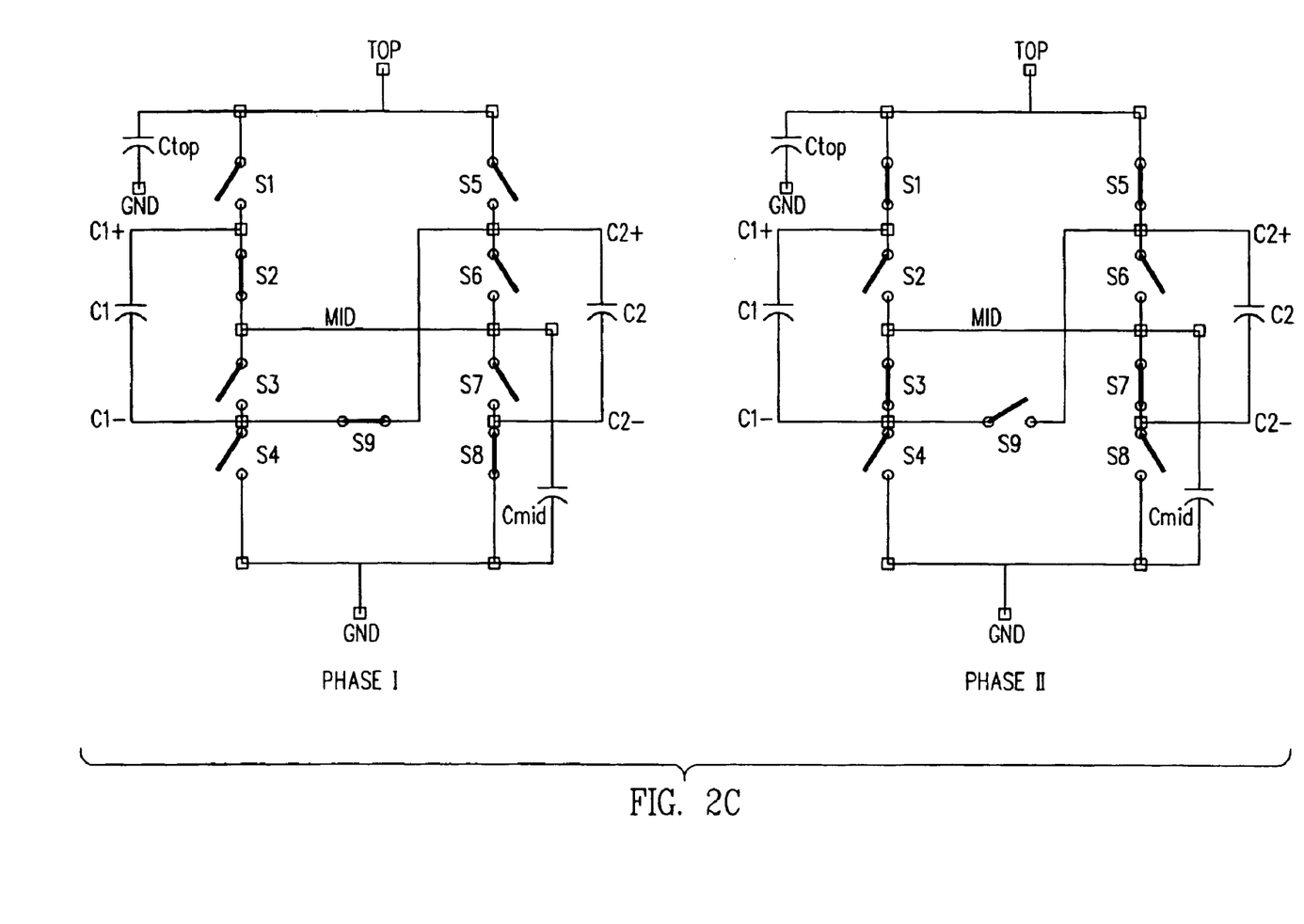

Referring to FIG. 2C, for conversion ratio of 3:2 in forward operation mode and conversion ratio of 2:3 in reverse operation mode, switching elements 18a, 18c, 18d, 18e, 18f, and 18g are open (or mostly "turned off") and switching elements 18b, 18h, and 18i are closed (or mostly "turned on") during Phase I. During Phase II, switching elements 18b, 18d, 18f, 18h, and 18i are open (or mostly "turned off") and switching elements 18a, 18c, 18e, and 18g are closed (or mostly "turned on").

Figure 2D:
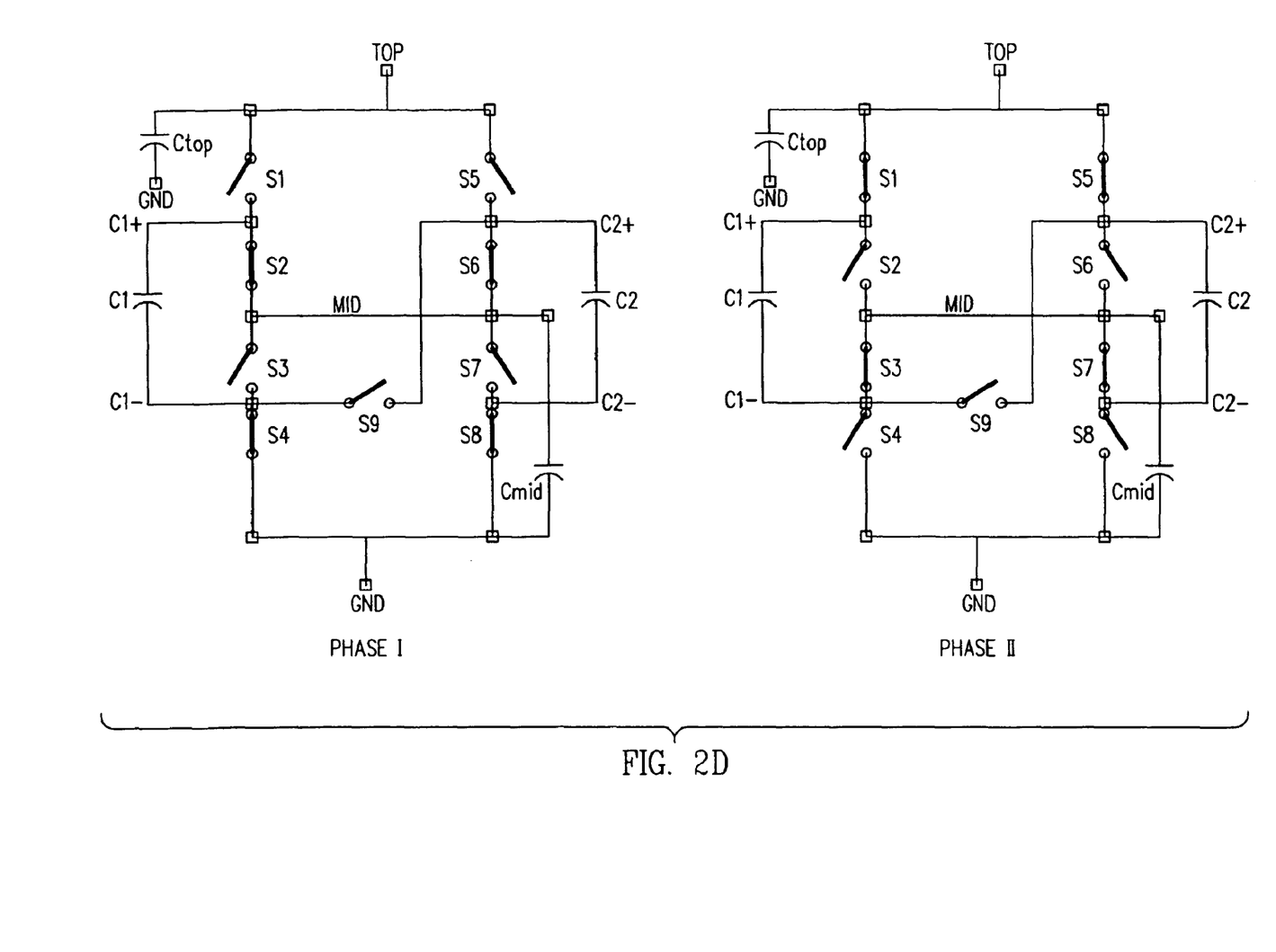

Referring to FIG. 2D, for conversion ratio of 2:1 in forward operation mode and conversion ratio of 1:2 in reverse operation mode, switching elements 18a, 18c, 18e, 18g, and 18i are open (or mostly "turned off") and switching elements 18b, 18d, 18f, and 18h are closed (or mostly "turned on") during Phase I. During Phase II, switching elements 18b, 18d, 18f, 18h, and 18i are open (or mostly "turned off") and switching elements 18a, 18c, 18e, and 18g are closed (or mostly "turned on").

Figure 2E:
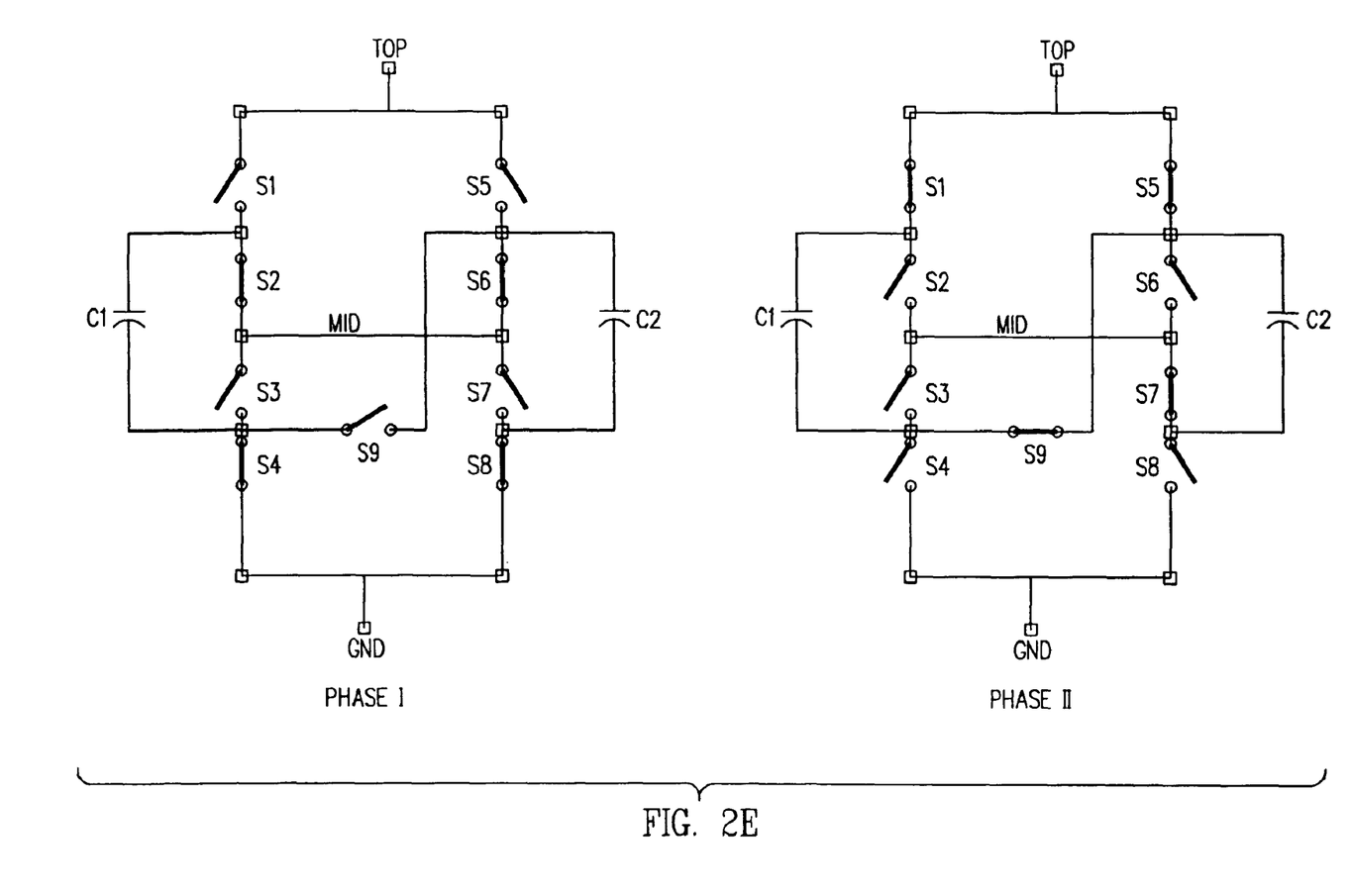

Referring to FIG. 2E, for conversion ratio of 3:1 in forward operation mode and conversion ratio of 1:3 in reverse operation mode, switching elements 18a, 18c, 18e, 18g, and 18i are open (or mostly "turned off") and switching elements 18b, 18d, 18f, and 18h are closed (or mostly "turned on") during Phase I. During Phase II, switching elements 18b, 18c, 18d, 18e, 18f, and 18h are open (or mostly "turned off") and switching elements 18a, 18g, and 18i are closed (or mostly "turned on").

Fractional Switch

Figure 3:
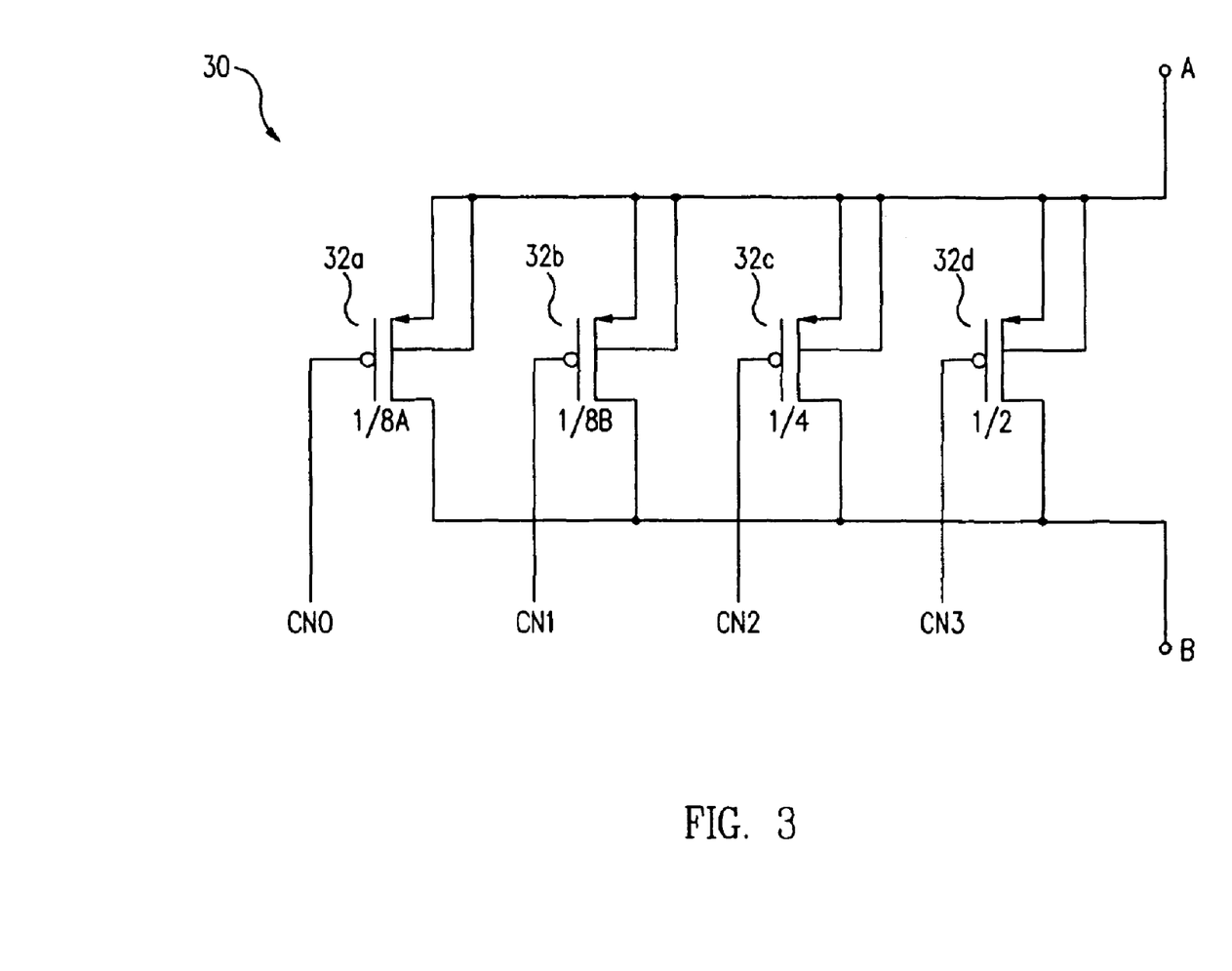
FIG. 3 is a schematic diagram of an exemplary implementation for a fractional switch, according to an embodiment of the present invention.

FIG. 3 is a schematic diagram of an exemplary implementation for a fractional switch 30, according to an embodiment of the present invention. In one embodiment, such a fractional switch 30 can be used for one or more (up to all) of switching elements 18 shown in FIGS. 1B and 2A–2E. As depicted, fractional switch 30 comprises a number of segments or transistors 32 (separately labeled 32a, 32b, 32c, and 32d) coupled in parallel between a node A and a node B. Each such transistor 32 can be any suitable transistor, such as, for example, PMOS or NMOS transistor.

In other embodiments, more or less transistors 32 can be used. The transistors 32 can be separately turned on and off by respective control signals CN0, CN1, CN2, and CN3.

The sizes of transistors 32 can be the same or may vary. For example, in one embodiment, transistors 32a and 32b can implemented as relatively small-sized transistors; transistor 32c can be implemented as a relatively medium-sized transistor; and transistor 32d can be implemented as a relatively large-sized transistor.

By turning on various combinations of the transistors 32 at different times, the fractional switch 30 can be adjusted to accommodate or handle different loads between nodes A and B. Thus, for example, for light loads, only a relatively small transistor (e.g., transistor 32a) may be turned on. For heavy loads, more and larger transistors (e.g., transistors 32c and 32d) can be turned on. Fractional switch 30 is advantageous in that it can be used to provide more power efficiency. That is, more power is consumed when turning off/on larger transistors. With fractional switch 30, only the transistors 32 which are needed for a particular load are used, thus providing power efficiency. This also provides a reduction in noise, due to an overall reduction in peak current. The fractional switching technique can reduce peak switching currents at the light load. Furthermore, there is dynamic loss reduction because only some segments of switching element 18 are on at any given time.

Reverse/Forward Assignment

To determine whether system 10 has been connected to operate in forward operation mode or reverse operation mode, the voltage values at the TOP node 12 and the MID node 14 may be compared at the time power is applied to system 10 (for example, when power is provided to a chip on which system 10 may be implemented).

Figure 4:
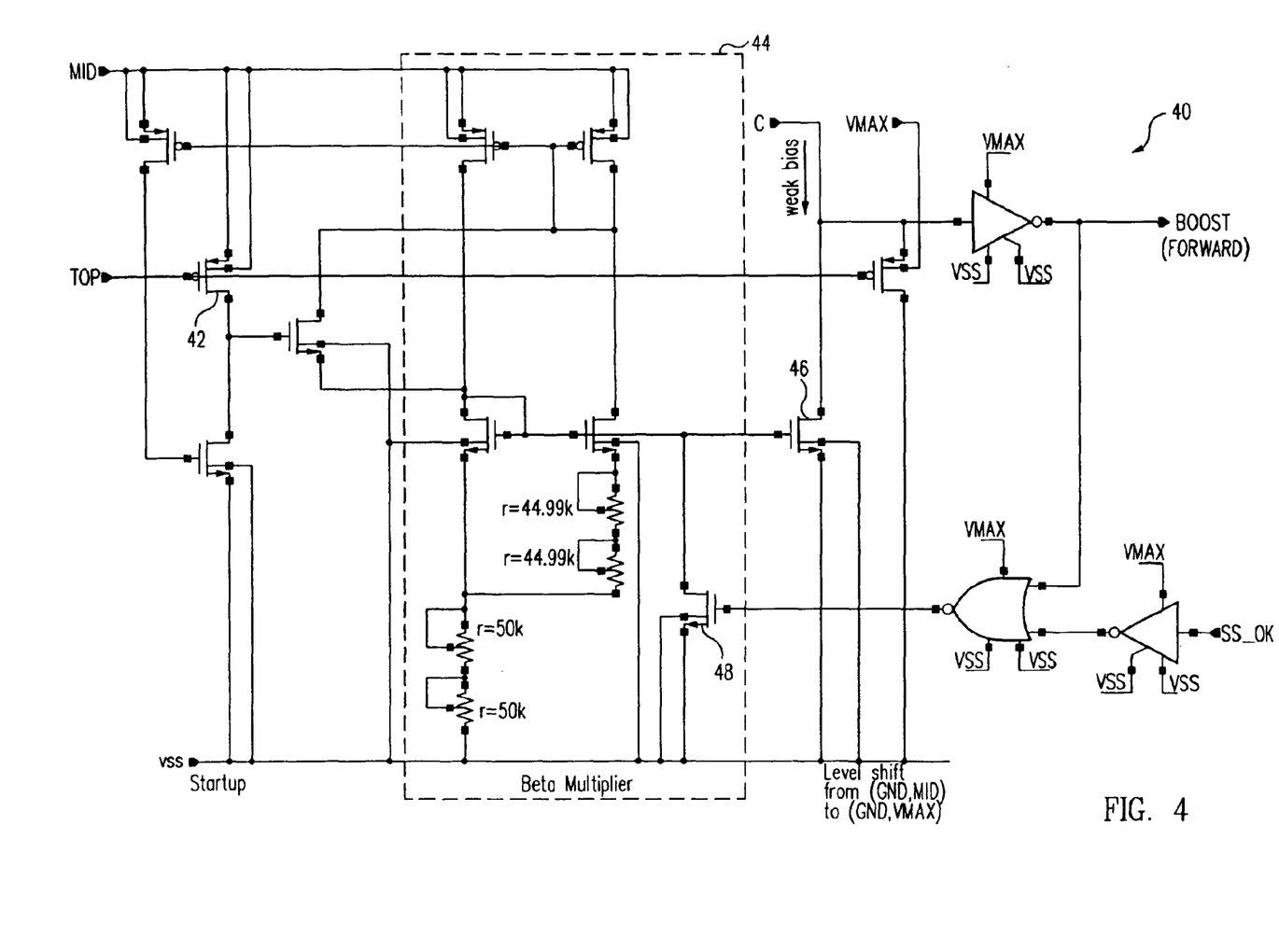
FIG. 4 is a schematic diagram of a circuit for assigning reverse/forward functions for nodes of a system, according to an embodiment of the present invention.

FIG. 4 is a schematic diagram of a circuit 40 for assigning whether the MID and TOP nodes of system 10 have been connected for forward operation mode or reverse operation mode, according to an embodiment of the present invention. As already discussed herein, in the reverse operation mode, the MID node 14 is connected as the input node and the TOP node 12 is connected as the output node; in forward operation mode, the TOP node 12 is connected as the input node and the MID node 14 is connected as the output node. In various embodiments, assigning circuit 40 may be integral to or separate from system 10, and may be implemented on the same or separate chip.

As depicted, assigning circuit 40 includes terminals for connection to the TOP and MID nodes of system 10. In general, whichever node has the higher voltage value at the start will be assigned the "input" function, and the other node will be assigned the "output" function. Assigning circuit 40 outputs a BOOST or FORWARD signal, the value of which indicates whether system 10 have been connected for forward operation mode or reverse operation mode. In one embodiment, as described herein, a low value (or logic 0) for the FORWARD signal indicates forward operation mode, and a high value (or logic 1) for the FORWARD signal indicates reverse operation mode.

In operation, if system 10 is in the reverse operation mode, the TOP node 12 (which is the output node) is at ground (GND) level at the start. A transistor 42 (which can be implemented as a PMOS transistor) will turn on and start up a multiplier 44. A transistor 46 (which can be implemented as an NMOS transistor), coupled to multiplier 44, will pull down a node C and make the output FORWARD signal go to a high ("logic 1") value. This indicates that system 10 has been connected for reverse operation mode.

In contrast, if system 10 is in the forward operation mode, the TOP node 12 (which is the input node) is at a higher voltage level at the start. The transistor 42 is turned or remains off. If the output value of system 10 (at MID node 14) is lower than 1.3V, the multiplier 44 (which may need a minimum headroom of 1.3V) will not start. If the output value is above 1.4V, then a transistor 48 (which may be implemented as an NMOS transistor), driven by BG_OK (band gap ok) or SS_OK (soft start ok) signal, is used to prevent the multiplier 44 from turning on at a later time. Transistor 46 is turned or remains off and the output FORWARD signal will be a low ("logic 0") value. This indicates that system 10 has been connected for forward operation mode.

Regulation of Output Voltage

In embodiments of the present invention, two techniques can be used to achieve the regulation of output voltage (at TOP or MID nodes). One technique involves the modulation of resistance from drain to source (R-dson) of the power switches while operating them at a constant switching frequency. The other technique involves skipping pulses (e.g., a PFM technique).

Figure 5:
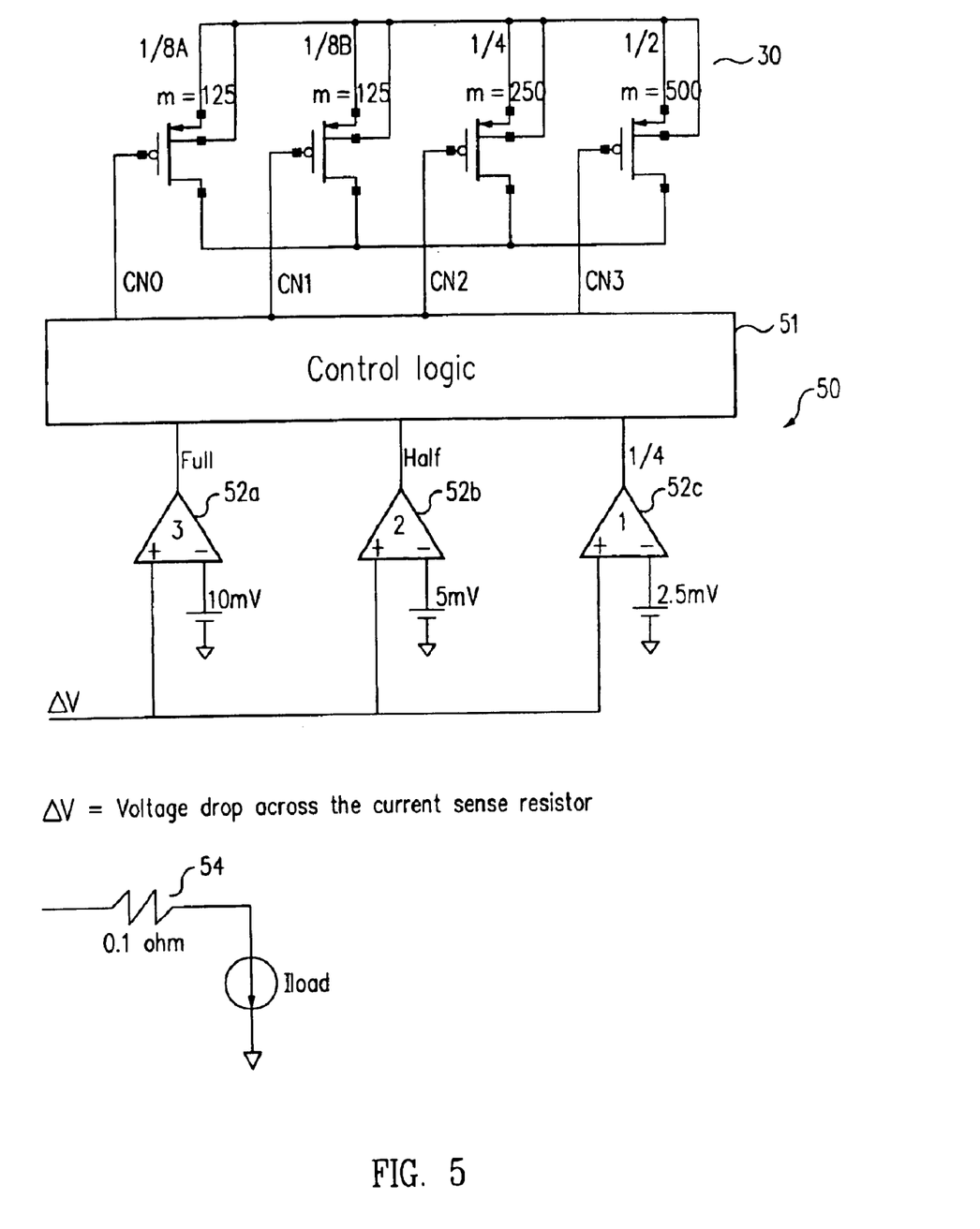
FIG. 5 is a schematic diagram of an approach for implementing fractional switching, according to an embodiment of the present invention.

FIG. 5 is a schematic diagram of an approach for implementing fractional switching, according to an embodiment of the present invention. In particular, FIG. 5 illustrates a circuit 50 which may be coupled to a fractional switch 30.

Circuit 50 includes a control logic 51 and a number of comparators 52 (separately labeled 52a, 52b, and 52c) for controlling which segments or transistors are turned on in the fractional switch 30. Circuit 50 determine the number of segments to be turned on based on current sense. The voltage drop ($\Delta V$) across a current sense resistor 54 (which can have a value of 0.1 ohm) is input into comparators 52. Each comparator 52 compares some this input voltage value against a predetermined reference value (e.g., 10 mV, 5 mV, or 2.5 mV), and outputs a signal (e.g., full, half, or one-quarter) to the control logic 51 based on the comparison. In one embodiment, if the voltage drop across the current sense resistor 54 is less than 2.5 mV, the outputs of comparators 52 are all low, only one smaller transistor or segment of fractional switch 30 will be turned on. If the voltage drop across the current sense resistor 54 is between 2.5 and 5 mV, the output of comparator 52c will be high, and control logic 51 may turn on only the ¼ segment of fractional switch 30. If the voltage drop is between 5 and 10 mV, the outputs of the comparators 52b and 52c will be high, and control logic 51 will turn on the ½ segment of switch 30. Finally, if the voltage drop is greater than 10 mV, the outputs of the comparators 52a, 52b, and 52c will all be high, and control logic 51 may turn on all segments. An implementation for control logic 51 would be understood to one of ordinary skill in the art based on the description contained herein.

From another view, with circuit 50, the number of the segments being turned on in fractional switch 30 depends on load conditions. If load current is more than 100 mA, then circuit 50 will turn on all segments. If the load current is between 50 mA to 100 mA, then circuit 50 will only turn on the ½ segment. If the load current is between 25 mA to 50 mA, then circuit 50 will only turn on the ¼ segment. If the load current is lower than 25 mA, circuit 50 will only turn on one ⅛ segment. Here the number of segments needed is assumed to be proportional to the load current. In other embodiments, the number of segments turned on or the size of segments may be adjusted or differ.

Figure 6:
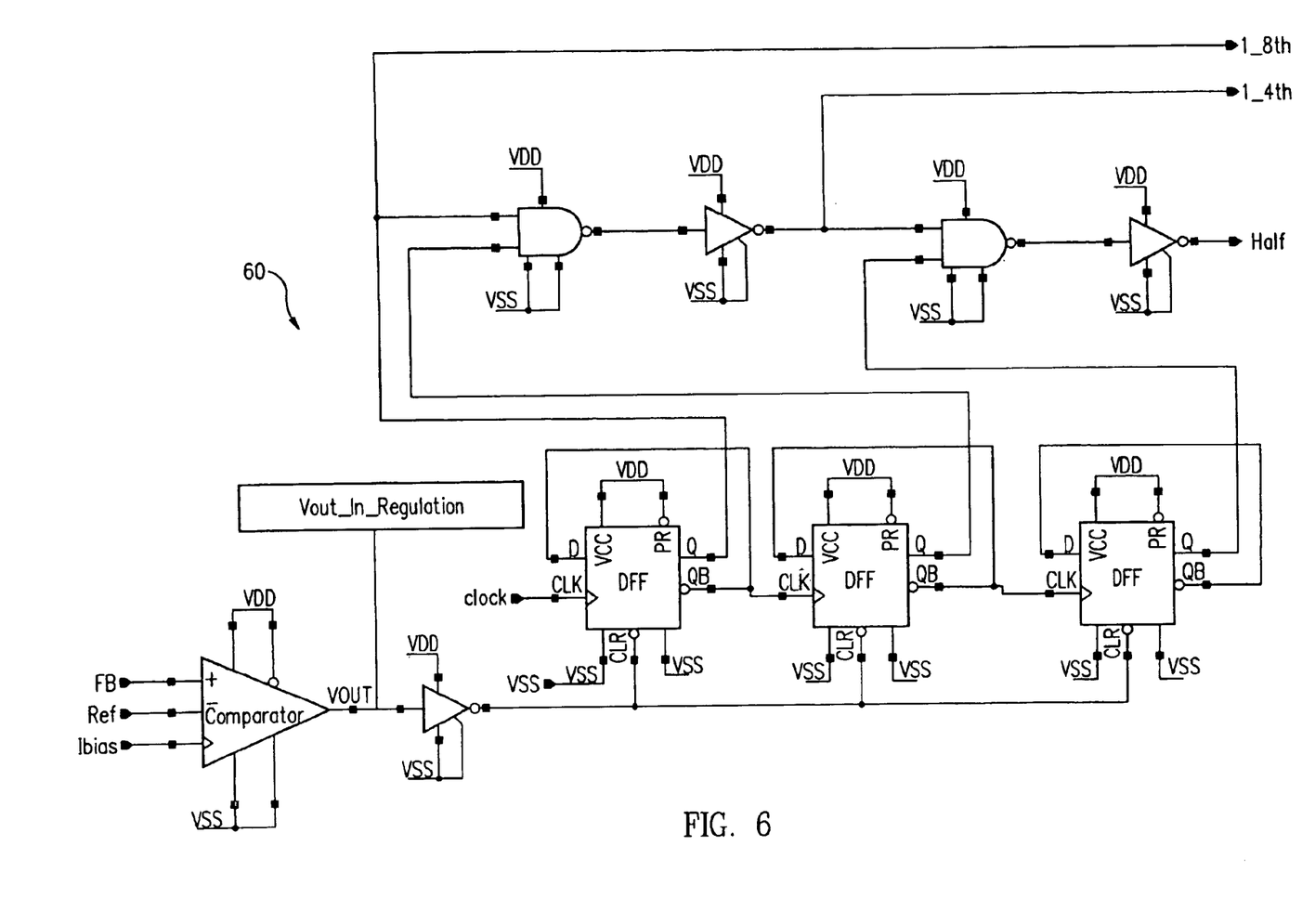
FIG. 6 is a schematic diagram of another approach for implementing fractional switching, according to an embodiment of the present invention.

FIG. 6 is a schematic diagram of another approach for implementing fractional switching, according to another embodiment of the present invention. Specifically, FIG. 6 illustrates a circuit 60 which (like circuit 50 shown in FIG. 5) may be coupled to a fractional switch 30 for controlling which segments or transistors are turned on. In one embodiment, with circuit 60, the ⅛th segment is first turned on when the output is out of regulation. If at the third pulse the output is still not in regulation (i.e., the comparator output, Vout_In_Regulation, is low), then another ⅛ segment is turned on. If at the fifth pulse the output is still not in regulation, circuit 60 turns on the ¼ segment of the fractional switch. Circuit 60 turns on ½ segment only when the output does not reach regulation at the ninth pulse.

Figure 7:
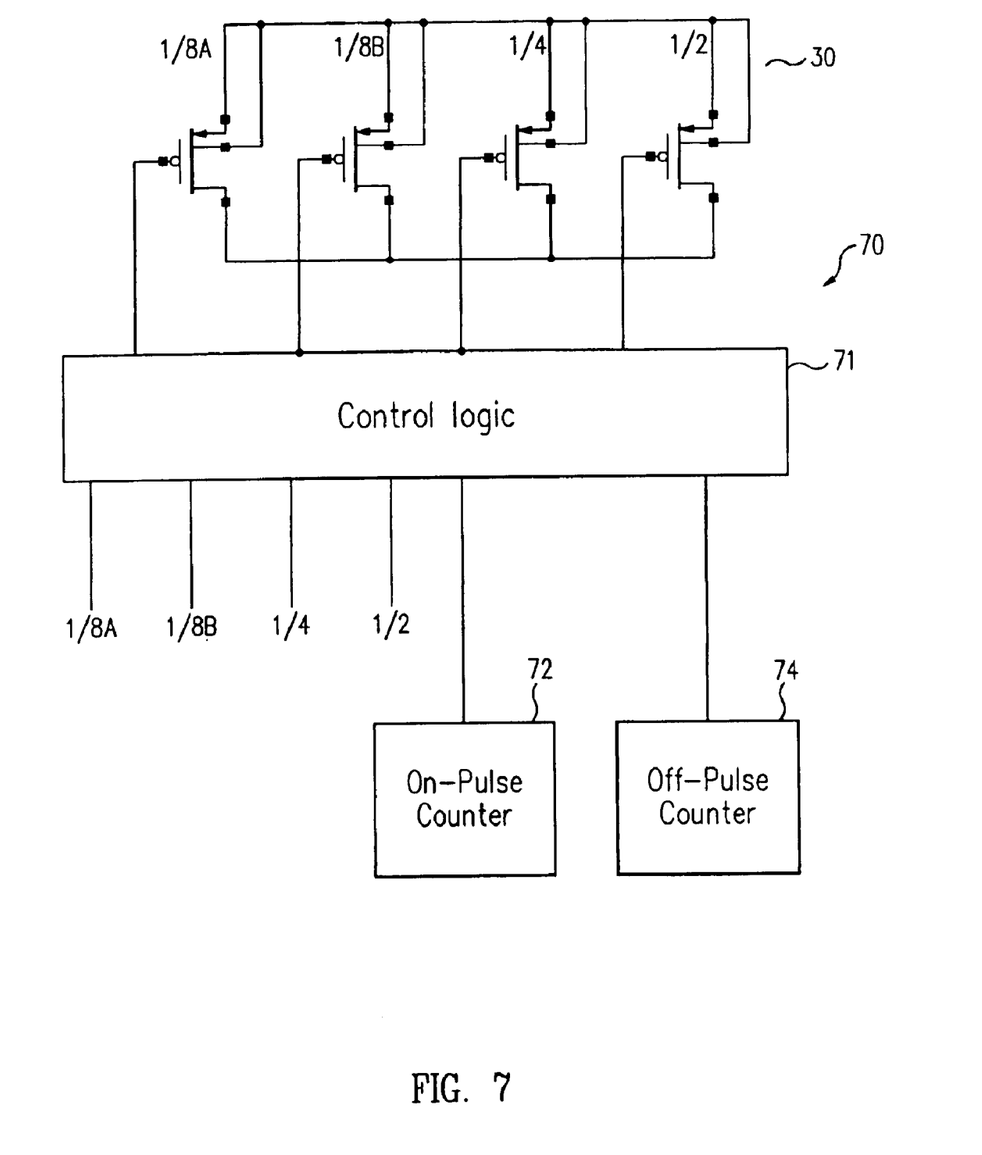
FIG. 7 is a schematic diagram of yet another approach for implementing fractional switching, according to an embodiment of the present invention.

FIG. 7 is a schematic diagram of yet another approach for implementing fractional switching, according to an embodiment of the present invention. FIG. 7 shows a circuit 70 which may be connected to a fractional switch 30. Circuit 70 includes control logic 71 and pulse counters 72 and 74 which cooperate to determine the number of segments to be turned on in fractional switch 30. On-pulse counter 72 generates one or more on-pulses, and off-pulse counter 74 generates one or more off-pulses. Control logic 71 uses the segment inputs from previous cycle, the number of on-pulses, and the number of off-pulses to determine the number of segments to be turned on in the next cycle. An implementation for control logic 71 and pulse counters 72 and 74 would be understood to one of ordinary skill in the art based on the description contained herein.

Compared to the approach of modulating the Rdson of a switching element 18, the pulse-skipping (PFM) approach (for example, implemented by circuit 70) has higher efficiency at light load but with higher current spikes. Therefore, it is desirable to scale down this "switching noise" at the light load without a sacrifice of the efficiency in the pulse skipping PFM approach. This is achieved by use of fractional switches (e.g., fractional switch 30).

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

It should also be understood that a variety of changes may be made without departing from the essence of the invention. Such changes are also implicitly included in the description. They still fall within the scope of this invention. Further, each of the various elements of the invention and claims may also be achieved in a variety of manners. This disclosure should be understood to encompass each such variation, be it a variation of an embodiment of any apparatus embodiment, or even merely a variation of any element of such. Particularly, it should be understood that as the disclosure relates to elements of the invention, the words for each element may be expressed by equivalent apparatus terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A charge pumping system capable of a forward operation mode and a reverse operation mode, wherein in forward operation mode the charge pumping system can step-up an input voltage at a ratio of ½:1 and can step-down the input voltage at a ratio of n:m where n and m are both integer values and n is equal to or greater than m, and wherein in reverse operation mode the charge pumping system can step-down the input voltage at a ratio of 1:½ and 1:1 and can step-up the input voltage at a ratio of p:q where p and q are both integer values and p is less than q, comprising a circuit for automatically assigning the charge pumping system to function in the forward operation mode or the reverse operation mode based at least in part on the input voltage.

2. The system of claim 1 comprising:
   a first node operable to be connected as either an input node or as an output node for the system; and
   a second node operable to be connected as either an input node or as an output node for the system.

3. The system of claim 1 comprising a switching component operable to be configured to set the ratio for step-up or step-down for the forward and reverse operation modes.

4. The system of claim 3 wherein the switching component comprises a plurality of switching elements, at least a portion of the switching elements each comprising a fractional switch.

5. The system of claim 4 wherein each fractional switch comprises a plurality of segments, each segment operable to be individually turned on and off.

6. The system of claim 5 further comprising a control circuitry for turning on and turning off the switching elements.

7. The system of claim 1 wherein the system is implemented in a single monolithic semiconductor die.

8. A charge pumping system capable of a forward operation mode and a reverse operation mode, the system comprising:
   a first node operable to be connected as an input node in the forward operation mode and as an output node in the reverse operation mode;
   a second node operable to be connected as an input node in the reverse operation mode and as an output node in the forward operation mode;
   wherein in forward operation mode the charge pumping system can step-up an input voltage at a ratio of ½:1 and can step-down the input voltage at a ratio of n:m where n and m are both integer values and n is equal to or greater than m, and wherein in reverse operation mode the charge pumping system can step-down the input voltage at a ratio of 1:½ and 1:1 and can step-up the input voltage at a ratio of p:q where p and q are both integer values and p is less than q;
   a switching component connected to the first node and the second node, the switching component operable to be configured to set the ratio for step-up or step-down for the forward and reverse operation modes, the switching component comprising at least one fractional switch having a plurality of segments; and
   a circuit for automatically assigning the charge pumping system to function in the forward operation mode or the reverse operation mode based at least in part on the input voltage.

9. The system of claim 8 further comprising a control circuitry for turning on one or more segments of the fractional switch.

10. The system of claim 9 wherein the control circuitry implements a PFM technique to turn on the segments.

11. The system of claim 8 wherein the system is implemented in a single monolithic semiconductor die.

12. A charge pumping system operable to be connected among a plurality of terminals for functioning in a step-up/step-down operation and, without changing the connection among the plurality of terminals, for functioning in a step-down/step-up operation, the system comprising:
   a switching component operable to regulate the charge pumping system in the step-up/step-down operation and in the step-down/step-up operation; and
   a circuit for automatically assigning the system to function in the step-up/step-down operation or the step-down/step-up operation based on the respective voltage potentials at the various terminals.

13. The charge pumping system of claim 12 wherein in the step-up/step-down operation the charge pumping system can step-up an input voltage at a ratio of ½:1 and can step-down the input voltage at a ratio of n:m where n and m are both integer values and n is equal to or greater than m, and wherein in the step-down/step-up operation the charge pumping system can step-down the input voltage at a ratio of 1:½ and 1:1 and can step-up the input voltage at a ratio of p:q where p and q are both integer values and p is less than q.

14. The charge pumping system of claim 12 wherein the switching component comprises a plurality of switching elements, each switching element operable to be adjustably turned on depending upon load conditions for the charge pumping system, thereby providing better power efficiency.

15. The charge pumping system of claim 14 further comprising a control circuit for turning on one or more switching elements of the switching component.

16. The charge pumping system of claim 12 wherein the system is implemented in a single monolithic semiconductor die.

* * * * *